W. D. FUREY.
TIRE.
APPLICATION FILED MAY 4, 1910.
987,292.  Patented Mar. 21, 1911.
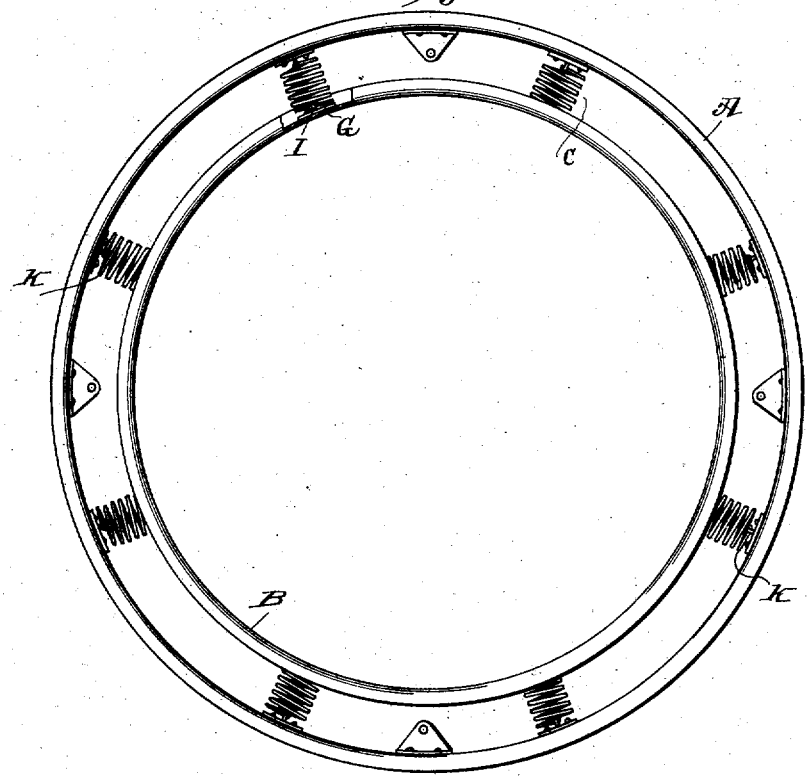
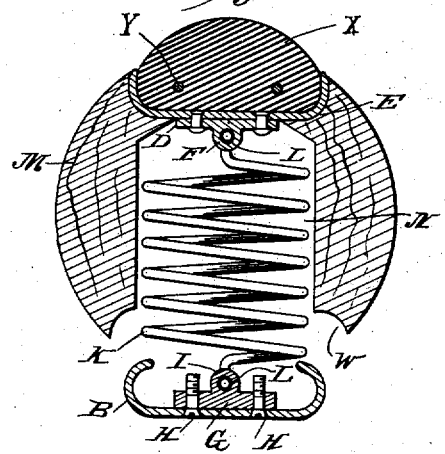
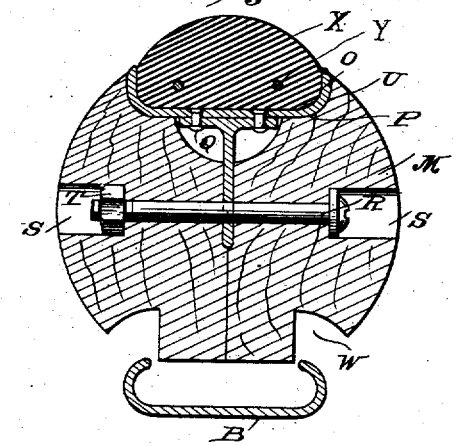
WITNESSES:
E. M. Callaghan
C. E. Trainor
INVENTOR
WILLIAM D. FUREY
BY Munn & Co.
ATTORNEYS ized subject, placed...

UNITED STATES PATENT OFFICE.

WILLIAM DILL FUREY, OF NORFOLK, VIRGINIA, ASSIGNOR OF ONE-HALF TO WILLIAM T. ANDERSON, OF NORFOLK, VIRGINIA.

TIRE.

987,292.     Specification of Letters Patent.     Patented Mar. 21, 1911.

Application filed May 4, 1910. Serial No. 559,283.

*To all whom it may concern:*

Be it known that I, WILLIAM D. FUREY, a citizen of the United States, and a resident of Norfolk, in the county of Norfolk and State of Virginia, have invented certain new and useful Improvements in Tires, of which the following is a specification.

My invention is an improvement in tires, and consists in certain novel constructions and combinations of parts, hereinafter described and claimed.

The object of the invention is to provide a simple and inexpensive resilient tire for use in automobiles and like vehicles, which will closely resemble the pneumatic tire and provide a sufficient degree of resiliency without any possibility of damage from puncture.

Referring to the drawings forming a part hereof: Figure 1 is a side view of the tire with the cheek plates removed; Fig. 2 is a transverse section on the line of a cushion, and Fig. 3 is a similar view between the cushion.

The present embodiment of the invention consists of an outer rim A and an inner rim B, which are connected at spaced intervals by cushioning devices C. At spaced intervals on the outer rim A, plates D are riveted by rivets E, each of said plates having a perforated ear F, at approximately the center thereof. Other plates G are connected to the inner rim B by means of screws H, which pass through countersunk openings in the rim and through threaded openings in the plate. The plate G is provided with a perforated ear I, and a coil spring K is provided at each end with a hooked portion L, one of which engages the lug F and the other the ear I. A filling M is arranged between the inner and the outer rims, the said filling being preferably of wood and having recesses N at intervals in which the cushioning devices are arranged. At spaced intervals brackets each consisting of a foot O and a depending lug P are secured to the outer rim by rivets Q, and the depending lug P is transversely perforated. Bolts R are passed transversely through the openings in the filling M and through the registering perforations of the lug P to hold the outer rim to the filling, and the said filling is countersunk at each end of the opening for receiving the bolt as at S to receive the head of the bolt and the nut T. As will be evident from an inspection of Figs. 2 and 3 the inner rim B is normally held spaced apart from the filling by the cushioning devices and the said filling is recessed as at U and W to receive the outer and the inner rims respectively.

In operation when pressure is brought to bear on the outer rim at any point the cushioning devices are compressed and the rims move toward each other. This movement is limited by the engagement of the inner rim with the filling and a solid tire X is seated in the outer rim to assist in the cushioning effect of the cushioning devices. The said tire is provided with metallic reinforces in the shape of rings Y of wire or other suitable material embedded in the substance thereof. By turning the screws H, the distance of the plates G from the outer face of the inner rim may be adjusted to regulate the tension of the spring. It will be evident that when the plates are moved away from the rim, the spring will be placed under compression thus increasing the tension thereof while when the plates are drawn toward the face of the rim, the tension will be decreased.

I claim:—

1. A tire of the character specified, comprising transversely curved inner and outer rims spaced apart from each other, each rim having its concave face outwardly, plates riveted to the inner face of the outer rim at spaced intervals, each plate having a perforated ear, plates arranged at spaced intervals on the outer face of the inner rim and in radial alinement with the corresponding plates on the outer rim, each of said plates having a perforated ear, a coil spring connecting each pair of radially alined plates, means for adjusting the last-named plates toward and from the inner rim whereby to regulate the tension of the springs, and an annular wooden filling substantially circular in cross section arranged between the rims and recessed to receive the said rims, said filling having radial recesses for the springs, brackets secured to the outer rim at spaced intervals, each bracket having a depending perforated lug, bolts passing through the filling and the perforations of the lugs for holding the outer rim to the filling, and a solid rubber tire seated in the outer rim.

2. A tire of the character specified, comprising transversely curved inner and outer rims, each rim having its concave face outwardly, coil springs arranged between said rims at spaced intervals, means whereby the tension of each of said springs may be regulated, a wooden filling arranged between the rims, said filling having grooves to receive the rims, and having openings for receiving the springs, means for securing the outer rim to the filling, the inner rim being normally spaced apart from the filling.

3. A tire of the character specified, comprising inner and outer rims spaced apart from each other, springs arranged between the rims at spaced intervals, means for regulating the tension of each spring, a wooden filling between the rims, said filling being grooved to receive the outer rim and having openings through which the springs extend, the inner rim being normally spaced apart from the filling, and means for securing the outer rim to the filling.

WILLIAM DILL FUREY.

Witnesses:
HERMANN H. ANDERSON,
WM. T. ANDERSON.

---

Copies of this patent may be obtained for five cents each, by addressing the "Commissioner of Patents, Washington, D. C."